United States Patent [19]
Bell

[11] 3,826,372
[45] July 30, 1974

[54] FLEXIBLE FILTER
[75] Inventor: Rupert B. Bell, Grosse Point Park, Mich.
[73] Assignee: R. L. Kuss & Co., Inc., Findlay, Ohio
[22] Filed: June 14, 1973
[21] Appl. No.: 370,017

[52] U.S. Cl................................. 210/172, 210/460
[51] Int. Cl............................................. E03b 11/00
[58] Field of Search ........... 210/172, 459, 460, 461, 210/462, 463, 507

[56] References Cited
UNITED STATES PATENTS
| | | | |
|---|---|---|---|
| 1,394,011 | 10/1921 | Hills | 210/172 |
| 2,381,949 | 8/1945 | Goodloe | 210/461 |
| 2,628,741 | 2/1953 | Wilds | 210/172 |
| 2,788,125 | 4/1957 | Webb | 210/172 |
| 2,810,482 | 10/1957 | Kasten | 210/460 |
| 2,923,411 | 2/1960 | Oster | 210/172 |
| 3,023,905 | 3/1962 | McDougal et al. | 210/460 |
| 3,108,065 | 10/1963 | McMichael | 210/172 |

Primary Examiner—Theodore A. Granger
Attorney, Agent, or Firm—Owen & Owen

[57] ABSTRACT

The invention is a flexible fuel filter for use, for example, in an automotive fuel tank. The filter depends from an obliquely angled outlet tube and is flexed against the tank bottom, so that the lower end of the filter is maintained in forced contact with the tank bottom to assure pick-up of fuel at the lowest level. A bias wrapped filter mesh serves as a flexible sleeve which is sealingly retained by an interior flexible spool including a closure on one end and means for attachment to the outlet tube on the other end.

8 Claims, 9 Drawing Figures

PATENTED JUL 30 1974 3,826,372
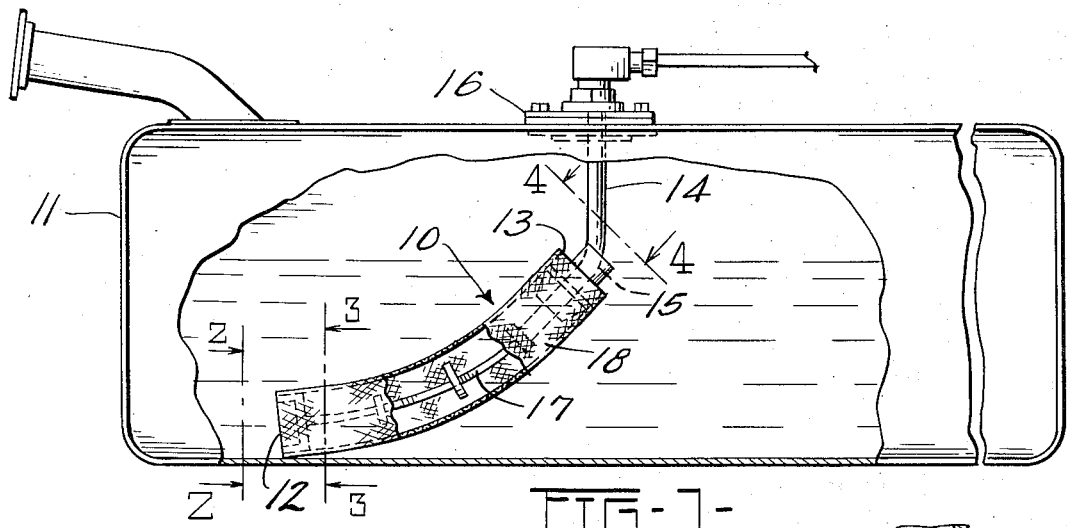
FIG-1-
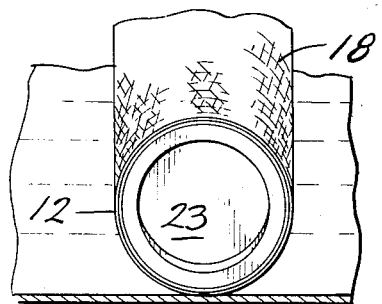
FIG-2-
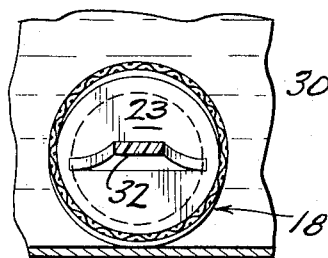
FIG-3-
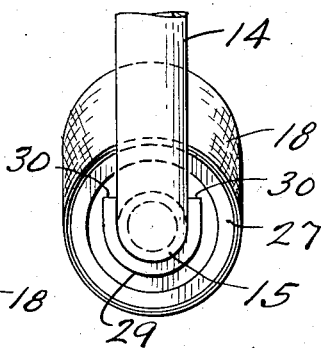
FIG-4-
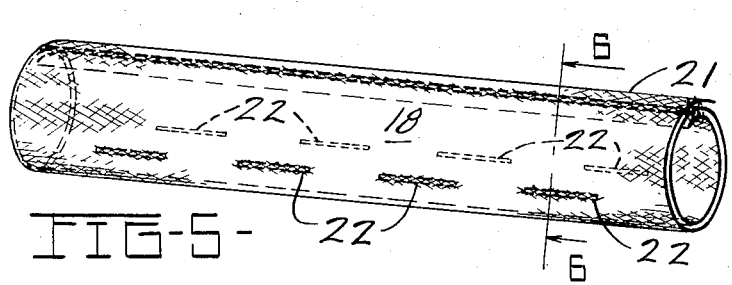
FIG-5-
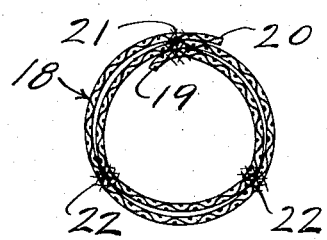
FIG-6-
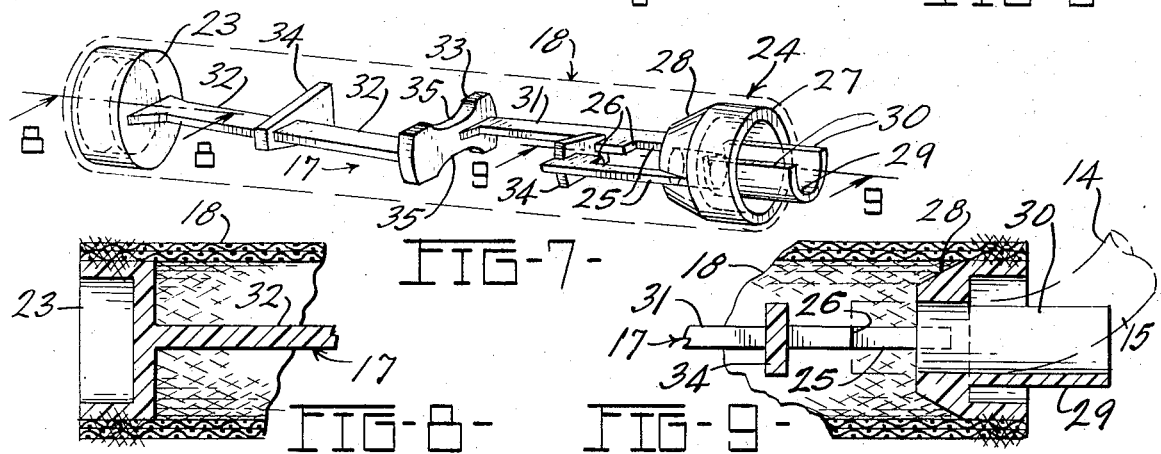
FIG-7-
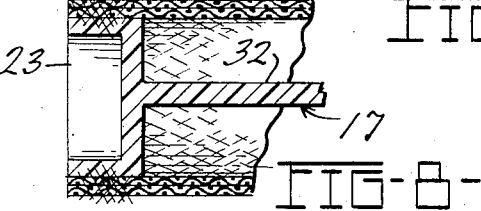
FIG-8-
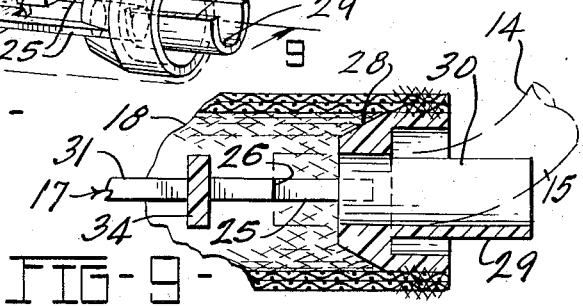
FIG-9-

FLEXIBLE FILTER

BACKGROUND OF THE INVENTION

In a vehicular fuel tank, a fuel filter is generally provided which is suspended above the bottom of the tank or which floats in the fuel. However, many current tanks are of a shallow, flat configuration which makes desirable the withdrawal of the fuel from a point quite close to the bottom in order to make use of substantially all the fuel tank capacity. Since these shallower tanks of larger horizontal area have a greater capacity per inch of fuel depth, it becomes more important than with high thin tanks to be able to remove the last inch or so of fuel from the bottom of the tank; this is made possible with a filter resting on the bottom.

Generally, conventional prior art filters have not been installed in contact with the tank bottom. One reason for this is to prevent vibration and the consequent noise which would inevitably result in absence of a forced contact with the tank bottom. Some filters in use are made flexible for contact with the bottom of the fuel tank by being fabricated as tubes with no internal support except the circular support at the attachment end. However, because there is no internal support these filters tend to collapse at the bend produced by contact with the bottom of the fuel tank, thus cutting off a major portion of the filter mesh.

SUMMARY OF THE INVENTION

The present invention provides a fuel tank filter which may be maintained in contact with a tank bottom under a substantially uniform force. The filter is flexible and resilient by virtue of its inner core or spool and its mesh sleeve, which is preferably bias wrapped for increased flexibility. Consequently, the filter may be connected to an obliquely angled outlet tube and flexed in forced contact against the bottom of the tank. This eliminates any necessity for difficult or expensive installation brackets which would have to be used to hold the filter on the tank bottom, and at the same time accommodates wide tolerances in the depth of the tank.

Securing the flexible filter at one end to the outlet tube with its other end biased against the tank bottom assures the withdrawal of the fuel from a low position in the tank and avoids vibration by virtue of the forced contact. Preferably, only the end of the filter makes contact with the tank bottom, because if any substantial area of the mesh were in such contact, that mesh area would be closed off. This also prevents too much area of the filter from being immersed in water condensate inevitably present in a fuel tank, which would likewise reduce effective mesh area for filtering the fuel.

To substantially prevent the introduction of water into the fuel supply line, the sleeve is of a mesh size and material which will readily admit hydrocarbon fuels but substantially prevent the passage of water. This type sleeve is known in the art. Also, the angle between the filter and the tank bottom and consequently the height of the outlet tube end, may be varied according to the shape of the tank. Shallower tanks may require a smaller angle.

Another object of the invention is to provide a flexible fuel filter which is inexpensive to manufacture and easy to install into a fuel tank. The interior spool of the filter is integrally molded and includes an upstream end adapted to receive an outlet tube. The sleeve is fabricated from one length of filter mesh fabric wound around and heat sealed in a preferably continuous lap seam. In turn this sleeve is heat sealed to the ends of the spool. On assembly into a fuel tank, the filter is simply press fit onto the end of the outlet tube until the outlet tube end rests against an abutment on the spool. When the outlet tube is rigidly attached to the tank, large tolerances are possible because of the flexing of the filter against the bottom of the tank. In addition, the tube preferably includes a bend which is engaged by a U-shaped portion of the spool, whereby the filter is automatically oriented within the tank with respect to rotation. This assures that the filter is flexed in the direction of greatest flexibility.

BRIEF DESCRIPTION OF THE DRAWINGS

FIG. 1 is a diagrammatic elevation view showing a flexible filter according to the instant invention installed in a fuel tank and flexed in biased contact against the bottom of the tank;

FIG. 2 is an end view of the flexible filter taken along the line 2—2 of FIG. 1;

FIG. 3 is a cross-sectional view of the filter taken along the line 3—3 of FIG. 1;

FIG. 4 is a view of the outlet tube connected in the filter, indicating the means of rotational orientation of the filter on the outlet tube, taken along the line 4—4 of FIG. 1, FIG. 5 is a perspective view of a bias-wrapped filter mesh sleeve according to the instant invention;

FIG. 6 is a cross-sectional view of the filter mesh sleeve showing its wrapping configuration, taken along the line 6—6 of FIG. 5;

FIG. 7 is a perspective view of a flexible spool according to the invention;

FIG. 8 is a cross-sectional view of an upstream portion of the spool, taken along the line 8—8 of FIG. 7; and FIG. 9 is a cross-sectional view of a downstream portion of the spool, taken along the line 9—9 of FIG. 7.

DESCRIPTION OF THE PREFERRED EMBODIMENT

Referring to the drawings, FIG. 1 shows a flexible filter according to the invention installed in a fuel tank 11 and generally indicated by the reference number 10. An upstream end 12 of the filter 10 is maintained in biased contact with the bottom of the tank 11. Connected to a downstream end 13 of the filter 10 is an outlet tube 14 which preferably has a bend 15 so that the downstream end 13 is held at an oblique angle. Alternatively, the entire outlet tube 14 may enter the tank 11 at an oblique angle. The tank 11 may have a sealable opening 16 large enough to facilitate installation of the filter 10, or the filter 10 and outlet tube 14 may be installed before fabrication of the tank 11 is completed.

A flexible spool 17 forms a structural core for the filter 10. Wrapped around and sealingly attached to this spool 17 is a filter mesh sleeve 18. As shown in FIG. 1, both the spool 17 and the sleeve 18 are flexible to allow a degree of resilient bending in the filter 10 without appreciable distortion. The flexibility of the mesh sleeve 18 is facilitated substantially by the wrapping of the mesh on a bias, as shown in FIGS. 1, 2, and 5.

Referring to FIGS. 5 and 6, the filter mesh sleeve 18 is shown in detail, preferably comprising a cylinder of at least two plies. As shown in FIG. 6, the sleeve 18 is wrapped from a single piece of filter cloth with an inner overlap 19 and an outer overlap 20. A heat sealed lap seam is formed at 21 which may be continuous as shown or intermittent, with a plurality of intermittent spot seals 22 in several lines spaced about the periphery of the sleeve 18. The spot seals 22 help retain the two plies of filter cloth together.

The filter cloth used in the sleeve 18 is preferably woven from a material resistant to hydrocarbon fuels and which is readily wetted by hydrocarbon fuels but not by water. One such material suitable for the filter sleeve 18 is a polyvinylidene chloride polymer marketed under the trademark "Saran" by Dow Chemical Company of Midland, Mich. The filter mesh sleeve 18 thus readily passes hydrocarbon fuels but tends to refuse water. The use of such material in a fuel tank filter is known in the art and does not form a part of this invention.

Turning now to FIG. 7, the integrally molded flexible spool 17 is shown with the sleeve 18 only diagrammatically indicated. The spool 17 is preferably molded from the same material as the sleeve 18. Included on the spool 17 are an upstream end 23 and a downstream end generally indicated by the reference number 24. The downstream end 24 is adapted to receive the outlet tube 14 by friction fit and includes a bifurcated frame 25 which is relatively rigid in both directions of bending for protection of the outlet tube 14. On the frame 25 are a pair of abutment stops 26 which engage the end of the tube 14 without impeding the fuel flow into the tube 14.

Connected to the frame 25 opposite the abutment stops 26 is a downstream end spool 27 which on assembly of the filter 10 is heat-sealed to the interior periphery of the sleeve 18. The end spool 27 is generally cylindrical with a frustoconical upstream portion 28. Besides economizing on material, this shape aids assembly by facilitating the sliding of the sleeve 18 over the downstream end spool 27. Extending out of the end spool 27 is a U-shaped sleeve 29 which receives the bend 15 in the outlet 14, forcing the desired orientation of the filter 10 with respect to the tube 14. Details of this relationship are shown in FIGS. 4 and 9. Rotation of the filter 10 on the tube 14 is obstructed by the extended legs 30 which engage the bend 15 in the tube 14.

The flexible spool 17 includes a pair of generally longitudinal struts 31 and 32 of rectangular cross-section. These struts 31 and 32 are oriented with their major dimension substantially normal to the plane of the bent outlet tube 14. The bifurcated frame 25 and both struts 31 and 32 lie in one plane in the unflexed filter spool 17, as can be visualized in FIG. 7. The downstream strut 31 extends from and is a part of the frame 25, as shown in FIG. 7, and terminates into one side of a disc-like jointing member 33, which is perpendicular to the plane of the frame 25 and struts 31 and 32. The upstream strut 32 is connected to the opposite side and face of the jointing member 33, thus defining an offset relationship between the struts and forming a semi-rigid joint. The strut 32 is also connected to the upstream end 23 of the spool 17.

The struts 31 and 32 and jointing member 33 are arranged to provide a high degree of flexibility in one direction, i.e., for bending within the plane of the bent outlet tube 14 or in a vertical direction as the filter is positioned within the tank as shown in FIG. 1. The lap seam 21 is oriented within the plane of the frame 25 and struts 31 and 32 to help facilitate this flexibility. In the perpendicular direction, however, only a limited degree of flexibility is allowed because bending is against the major axis of struts 31 and 32 and frame 25. This limited flexibility, often necessary on assembly of the flexible filter 10 into a fuel tank, is partially facilitated by the jointing member 33. However, this flexibility is limited because relative stiffness is necessary in one direction to provide the requisite axial stability for heat sealing of the sleeve 18 onto the spool 17. The heat sealing operation usually requires some axial compression.

A plurality of spacer members 34 are provided to prevent buckling or collapse of the sleeve 18 during flexing when the filter is installed in the tank. Buckling should be avoided because its effect is to reduce the effective area of the filter mesh sleeve 18. Accordingly, the spacer members 34 engage the sleeve 18 as it tends to buckle during flexing. The jointing member 33 also acts as a central spacer member. These spacer members 33 and 34 must be limited in area to avoid seriously impeding the longitudinal flow of fuel toward the outlet tube 14. Thus the members 34 can be generally triangular in shape and the jointing member 33 and arcuate notches 35 to allow free fuel flow.

As previously mentioned, the filter cloth making up the tubular periphery of the generally cylindrical filter is cut or wrapped on the bias, that is, with its warp or weft filaments at an angle, preferably 45°, to the axis of the cylindrical filter. This can be accomplished in several ways, as by cutting on the bias the filter cloth strip which is wound to form the cylinder, as previously described, or by spirally winding an elongate strip of filter material on a mandrel such that the elements thereof are wound at an angle to the mandrel axis.

It has been discovered that bias wound or bias cut filters are advantageous for the filter of this invention for several reasons. Firstly, less force is required to bend or deform the filter by the given amount desired to complete its installation in the fuel tank as shown in FIG. 1. This may be because the bias-type filter can flex without direct tension or compression of the filaments (warp or weft), as would be the case with a straight cut filter. Consequently, the amount of strain on individual filaments and the total filter will be less for a bias filter when bent a given amount.

Secondly, it has been experimentally determined that a straight cut or straight wound filter cylinder has a tendency to buckle or collapse inwardly when bent so that the interior buckling will reduce the interior volume and fluid flow passage within the filter. Severe buckling or collapse would tend to make the interior walls of the filter contact one another to completely shut off the fluid passage and disable the portion of the filter upstream from the collapse. A bias-type filter of the preferred embodiment has less tendency towards such inward collapse.

Thirdly, when initially installed in the tank, the bias-type filter appears to have better recovery or spring-back properties if bent severely, such as 90°, during the installation or if accidently malformed during handling prior to installation.

As used herein and in the following claims, the term "bias-wrapped" is intended to characterize a filter element in which the warp or weft elements are intentionally placed at an angle to the axis of the filter cylinder, either by bias-cutting, bias winding, or other method of manufacture.

It will be seen that the above described preferred embodiment provides a flexible fuel tank filter capable of being installed against the bottom of a fuel tank. The filter is efficient in operation, economical to manufacture and easy to install. Various other embodiments and changes to the preferred embodiment described above will be apparent to those skilled in the art and may be made without departing from the spirit and scope of the following claims.

What I claim is:

1. A flexible filter for use in a fuel tank, said filter having upstream and downstream ends and comprising a flexible elongate spool having upstream and downstream ends connected by a flexible member extending generally axially thereof and including means extending radially outwardly within said filter intermediate said ends for preventing inward collapse of a surrounding filter mesh sleeve during flexing of said filter, said downstream end of said spool including connecting means for establishing fluid communication between said filter and an outlet tube, and a filter mesh sleeve peripherally retained by each of said ends of said spool to form a hollow filter chamber with an end of said spool at each end, whereby said filter and outlet tube may be so oriented within the tank that said filter is flexed with its upstream end maintained in biased contact with the bottom of the tank.

2. A flexible fuel filter for use in a fuel tank, said filter having upstream and downstream ends and comprising a flexible elongate spool having upstream and downstream ends connected by a flexible member extending generally axially thereof, said flexible member comprising a pair of offset elongate struts of rectangular cross section extending longitudinally inwardly from opposed ends of said spool and lying in one plane when said filter is in unflexed configuration, and a disc-like jointing member central to said spool and having a one side connected to one of said struts and another side connected to the other of said struts, said downstream end of said spool including connecting means for establishing fluid communication between said filter and an outlet tube, and a filter mesh sleeve peripherally retained by each of said ends of said spool to form a hollow filter chamber with an end of said spool at each end, whereby said filter and outlet tube may be so oriented within the tank that said filter is flexed with its upstream end maintained in biased contact with the bottom of the tank.

3. A flexible filter according to claim 2 wherein said flexible member includes said jointing member and further comprises a plurality of spacer members along the length of said spool for engaging said mesh during flexing of said filter.

4. A flexible fuel filter for use in a fuel tank, said filter having upstream and downstream ends and comprising a flexible elongate spool having upstream and downstream ends connected by a flexible member extending generally axially thereof, said downstream end of said spool having connecting means for establishing fluid communication between said filter and an outlet tube, said connecting means including a portion U-shaped in cross section for receiving a bend in the outlet tube to orient the interior of the bend toward the open side of said U-shaped portion, thereby preventing the filter from rotating about the outlet tube, and a filter mesh sleeve peripherally retained by each of said ends of said spool to form a hollow filter chamber with an end of said spool at each end, whereby said filter and outlet tube may be so oriented within the tank that said filter is flexed with its upstream end maintained in biased contact with the bottom of the tank.

5. A flexible fuel filter for use in a fuel tank, said filter having upstream and downstream ends and comprising a flexible elongate spool having upstream and downstream ends connected by a flexible member extending generally axially thereof, said downstream end of said spool having connecting means for establishing fluid communication between said filter and an outlet tube, said connecting means including means for preventing said filter from rotating about the outlet tube and further including abutment means for retaining the outlet tube at a predetermined position within said filter without obstructing the flow of the fuel into the outlet tube, and a filter mesh sleeve peripherally retained by each of said ends of said spool to form a hollow filter chamber with an end of said spool at each end, whereby said filter and outlet tube may be so oriented within the tank that said filter is flexed with its upstream end maintained in biased contact with the bottom of the tank.

6. In a fuel tank, an outlet tube with an end portion extending into the tank and a flexible fuel filter connected to said end portion, said flexible filter including a flexible internal support spool having opposed ends secured to and surrounded by a sleeve of filter mesh material forming a closed filter chamber between said spool ends, said filter and support spool being flexed in biased contact against the bottom of the tank, and internal means within said filter for preventing the collapse thereof.

7. The apparatus of claim 6 wherein said filter includes a filter mesh sleeve having the warp and weft elements of the mesh each oriented at an oblique angle to the longitudinal axis of the filter.

8. An intank fuel filter for automotive installation comprising, in combination, a generally cylindrical woven mesh filter sleeve having the warp and weft elements of the mesh each oriented at an oblique angle to the longitudinal axis of the filter, said filter having a lower closed end and an upper open end with means for connecting said upper end in fluid communication with a fuel line, said filter sleeve being circumjacent a generally axially extending interior member connecting said lower and upper ends and comprising a pair of offset elongate struts of rectangular cross section extending longitudinally inwardly from opposed ends of said spool and lying in one plane when said filter is in unflexed configuration, and a disc-like jointing member central to said spool and having a one side connected to one of said struts and another side connected to the other of said struts, whereby said filter is more flexible in bending within a plane normal to the plane of said struts than in bending within the plane of said struts.

* * * * *